United States Patent
Liu et al.

(10) Patent No.: US 11,768,967 B2
(45) Date of Patent: Sep. 26, 2023

(54) ADDRESS VERIFICATION FOR DIRECT MEMORY ACCESS REQUESTS

(71) Applicant: HEWLETT-PACKARD DEVELOPMENT COMPANY, L.P., Spring, TX (US)

(72) Inventors: Wei Ze Liu, Spring, TX (US); Monji G Jabori, Spring, TX (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 599 days.

(21) Appl. No.: 16/966,314

(22) PCT Filed: Mar. 15, 2018

(86) PCT No.: PCT/US2018/022583
§ 371 (c)(1),
(2) Date: Aug. 25, 2020

(87) PCT Pub. No.: WO2019/177608
PCT Pub. Date: Sep. 19, 2019

(65) Prior Publication Data
US 2023/0195946 A1     Jun. 22, 2023

(51) Int. Cl.
*G06F 21/79* (2013.01)
*G06F 21/85* (2013.01)

(52) U.S. Cl.
CPC ............. *G06F 21/79* (2013.01); *G06F 21/85* (2013.01)

(58) Field of Classification Search
CPC ................................ G06F 21/79; G06F 21/85
(Continued)

(56) References Cited

U.S. PATENT DOCUMENTS 6,629,162 B1 * 9/2003 Arndt ..................... G06F 13/28
710/28
7,401,234 B2    7/2008 Case et al.
(Continued)

FOREIGN PATENT DOCUMENTS

CN          2812118 Y  *  8/2006  ............. G06F 13/28
CN       101334760 A  * 12/2008  .......... G06F 11/0745
(Continued)

OTHER PUBLICATIONS

Balogh et al., "New possibilities for memory acquisition by enabling DMA using network card," 2013 IEEE 7th International Conference on Intelligent Data Acquisition and Advanced Computing Systems (IDAACS), Berlin, Germany, 2013, pp. 635-639, doi: 10.1109/IDAACS.2013.6663002. (Year: 2013).*
(Continued)

*Primary Examiner* — Peter C Shaw
(74) *Attorney, Agent, or Firm* — Knobbe, Martens, Olson & Bear, LLP (57) ABSTRACT

An example apparatus can receive a DMA request from a device, where the DMA request comprises an address and an ID of the device that uniquely identifies the device and wherein the device is a bus mastering device. The example apparatus can access a range of addresses using the ID of the device. An example apparatus can determine whether the address is in the range of addresses and can process the DMA request responsive to verifying that the address is in the range of addresses.

15 Claims, 4 Drawing Sheets

(58) Field of Classification Search
USPC .......................................................... 726/26
See application file for complete search history.

(56) References Cited

U.S. PATENT DOCUMENTS

| | | | | |
|---|---|---|---|---|
| 7,620,779 | B1* | 11/2009 | Klaiber | ............... G06F 12/0831 |
| | | | | 711/144 |
| 8,635,430 | B2 | 1/2014 | Craddock | |
| 9,223,737 | B1* | 12/2015 | Serebrin | ............... G06F 13/404 |
| 9,710,377 | B1* | 7/2017 | Kuzmin | ................... G06F 8/654 |
| 10,169,616 | B1* | 1/2019 | Nertney | ................... G06F 21/602 |
| 2006/0242332 | A1 | 10/2006 | Johnsen | |
| 2006/0288134 | A1 | 12/2006 | Baker | |
| 2011/0225651 | A1* | 9/2011 | Villasenor | ............... G06F 21/85 |
| | | | | 726/22 |
| 2011/0320758 | A1 | 12/2011 | Craddock et al. | |
| 2012/0023270 | A1* | 1/2012 | Nadehara | ................ G06F 9/468 |
| | | | | 710/110 |
| 2016/0062911 | A1* | 3/2016 | Kegel | .................... G06F 12/02 |
| | | | | 710/308 |
| 2017/0177909 | A1 | 6/2017 | Sarangdhar et al. | |
| 2020/0167487 | A1* | 5/2020 | Kida | ................... G06F 21/606 |
| 2022/0261486 | A1* | 8/2022 | Kida | ........................ G06F 21/79 |

FOREIGN PATENT DOCUMENTS

| | | | |
|---|---|---|---|
| EP | 2983088 A1 | 2/2016 | |
| KR | 102534161 B1 * | 5/2023 | .............. G06F 11/10 |
| WO | WO-2016033039 A2 * | 3/2016 | .............. G06F 12/02 |

OTHER PUBLICATIONS

Yongqing et al., "Fully memory based address translation in user-level network interface," 2011 IEEE 3rd International Conference on Communication Software and Networks, Xi'an, China, 2011, pp. 351-355, doi: 10.1109/ICCSN.2011.6014582. (Year: 2011).*

Lee et al., "Context-aware address translation for high performance SMP cluster system," 2008 IEEE International Conference on Cluster Computing, Tsukuba, Japan, 2008, pp. 292-297, doi: 10.1109/CLUSTR.2008.4663784. (Year: 2008).*

Kornaros et al., "I/O virtualization utilizing an efficient hardware system-level Memory Management Unit," 2014 International Symposium on System-on-Chip (SoC), Tampere, Finland, 2014, pp. 1-4, doi: 10.1109/ISSOC.2014.6972448. (Year: 2014).*

Markatos et al., "User-level DMA without operating system kernel modification," Proceedings Third International Symposium on High-Performance Computer Architecture, San Antonio, TX, USA, 1997, pp. 322-331, doi: 10.1109/HPCA.1997.569696. (Year: 1997).*

* cited by examiner

ADDRESS VERIFICATION FOR DIRECT MEMORY ACCESS REQUESTS

BACKGROUND

A computer system can include various electronic components, such as a processor, a memory, an input/output (I/O) device, and so forth. A bus can be provided over which various electronic components are able to communicate.

DETAILED DESCRIPTION

In a number of examples, a DMA register(s) (e.g., hardware DMA register(s)) can be utilized to verify an address of a DMA request. As used herein, DMA registers store an address range (e.g., DMA range) of a memory resource. As used herein, the DMA registers are hosted by a root port (e.g., root port device) and are updated by an operating system (OS). The root port device can control memory access using the address ranges stored in DMA registers of the root port device. The DMA request can be provided by a bus mastering (BM) device (e.g. BM capable device). As used herein, an address refers to a memory address of a memory resource.

A request from a BM device issued at a physical level to gain access to a memory resource may be undetectable at a software or firmware level. As a result, a malicious BM device inserted into a system may access a memory resource that the malicious BM device is not authorized to access. A "malicious" BM device refers to any BM device that may access a memory resource that the BM device should not.

Memory access validation can be performed by validating memory access with a user of a computer system. For example, a user can be asked to respond to a DMA request by either accepting access or blocking access. However, validating DMA requests with a user may be inconvenient and inefficient.

In some examples, a driver associated with the device can be initiated, based on a determination that the device is a trusted device. The driver can request a DMA range from OS. The OS can allocate memory resources for the device including a range of addresses. The DMA range can include a range of memory addresses. The OS can communicate the allocated memory resources (e.g., DMA range) to the driver. The OS can also write the DMA range corresponding to the BM device to the DMA registers of the root port device. The root port device can utilize the DMA range to validate DMA requests originating from the BM device.

Validating DMA requests at a root port device provides the ability to limit access to memory resources from devices that are trusted. For example, a device that provides an ID which identifies a different device and not itself may have limited or no access to the memory resources. A device that is trusted but that has been infected with malware can also have limited access to the memory resources. As such, manipulation of memory resources for malicious purposes can be eliminated or limited to a range of addresses as generated by the OS and as validated by the root port device. When the device is removed from the computer system, the OS can reset corresponding DMA register to remove access for the device to the memory resource.

The figures herein follow a numbering convention in which the first digit corresponds to the drawing figure number and the remaining digits identify an element or component in the drawing. For example, reference numeral 104 may refer to element "04" in FIG. 1 and an analogous element may be identified by reference numeral 204 in FIG. 2. Elements shown in the various figures herein can be added, exchanged, and/or eliminated to provide a number of additional examples. In addition, the proportion and the relative scale of the elements provided in the figures are intended to illustrate the examples described, and should not be taken in a limiting sense.

Figure 1:
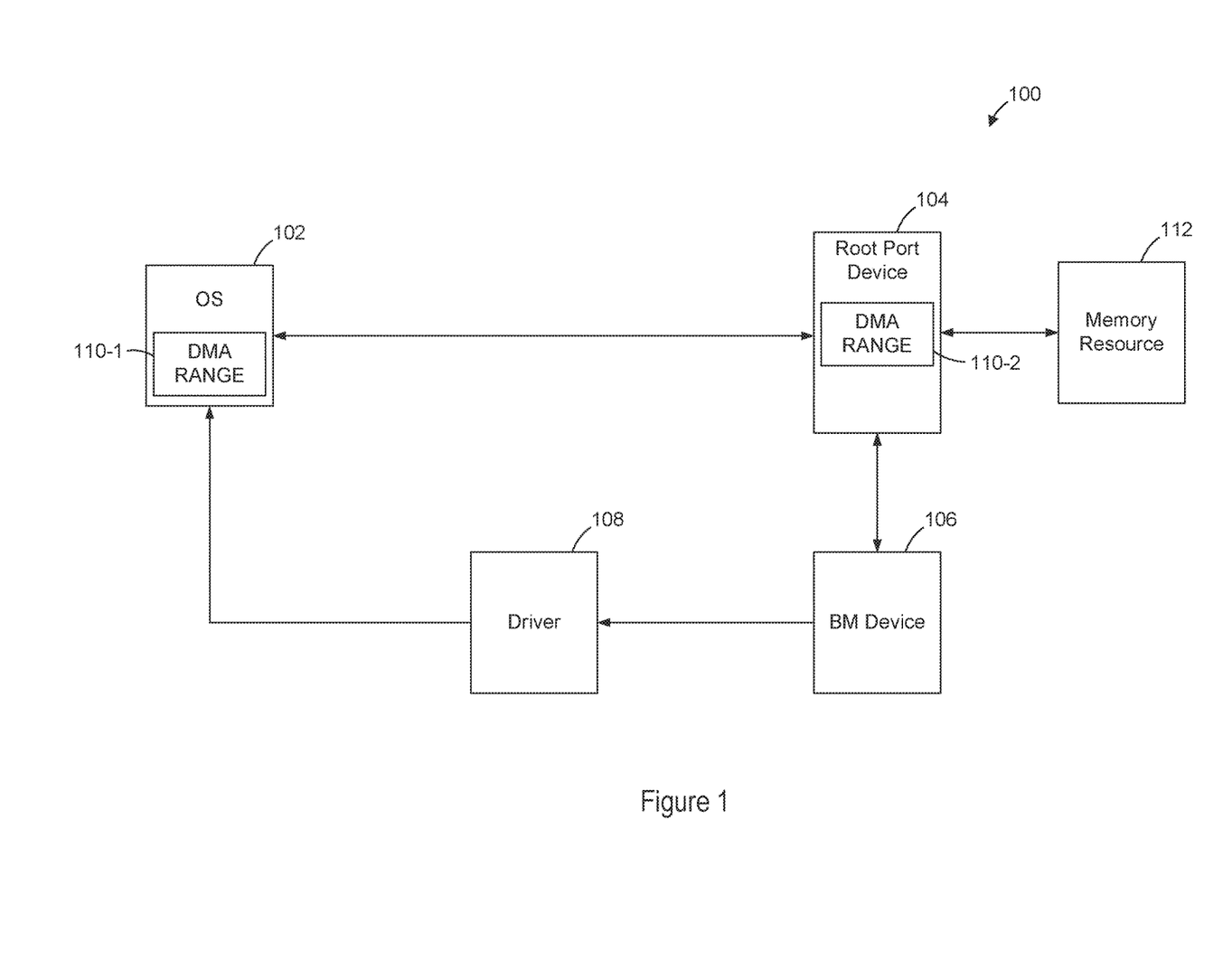
FIG. 1 illustrates an example of a system for processing direct memory access (DMA) requests by verifying addresses of a memory resource consistent with the disclosure.

FIG. 1 illustrates an example of a system 100 for processing DMA requests by verifying addresses of a memory resource consistent with the disclosure. The system 100 (e.g., computer system) can include an OS 102, a root port device 104, a BM device 106, a driver 108, and a memory resource 112.

As used herein, the OS 102 can include machine-readable instructions that manage system resources (e.g., hardware resources and/or software resources) and provide common services for applications. The BM device 106 is a device that is able to initiate access to the memory resource 112 (e.g., system memory) in the system 100 independent of a processor of the system 100. A BM device 106 can be referred to as a BM capable device. The BM device 106 can act as a master on a bus to issue a memory request over the bus to access the memory resource 112 accessible over the bus. A bus (e.g., hardware bus) can refer to any communication channel that allows a device to communicate with another device.

As used herein, a root port device 104 for a BM device 106 can refer to a control portion of a chipset of the system 100 (e.g., computer system) including a memory control functionality to control access of a memory, an input/output (I/O) control functionality to control operation of I/O devices, and a graphics control functionality to provide control of presentation of graphics in a display device, among others. A chipset can include an integrated circuit (IC) chip or a collection of IC chips. For example, an IC chip (or multiple IC chips) can include a system-on-a-chip (SOC), a northbridge controller, a southbridge controller, a memory hub controller, and/or an I/O hub controller, among others.

When device insertion is detected, the system 100 can enable power to the BM device 106. The system 100 can read an identifier (ID) from the BM device 106 and validate the ID against a pre-existing list of trusted IDs corresponding to trusted devices. If the ID is determined to be on the list of trusted IDs, the OS 102 can load the driver 108 corresponding to the BM device 106. If the ID is determined not to be on the list of trusted IDs, the power to the BM device 106 can be turned off. Said differently, the OS 102 can determine whether the BM device 106 is a trusted device.

In accordance with some examples, the system 100 can initially block access by the BM device 106 of the memory resource 112 until the system 100 is able to authorize the BM device 106 and/or validate an address (or a range of addresses) of a DMA request. The blocking is performed by logic (in the form of machine-readable instructions and/or a hardware logic) that is separate from the BM device 106. In some examples, the blocking is performed upstream of the BM device 106. A component that is upstream of the BM device 106 on a bus refers to a component that the BM device 106 has to interact with to access the memory resource 112. In some examples, the initial blocking of access of the memory resource 112 by the BM device 106 is at a root port device 104.

In some examples, the system 100 can generate and/or store a DMA range at the root port device 104 (e.g., upstream root port device) of the inserted BM device 106 with an invalid range. No DMA access is provided to devices that are inserted (e.g., coupled to the computer system) before the devices are validated as trusted devices The BM device 106 can generate DMA requests to request access to memory resources. The DMA request can be provided in the form of BM cycles, among other forms of DMA requests. The OS 102 can manage the memory resource 112. The OS 102 can generate and store a DMA range 110-1 correspond to memory addresses that can be used to access the memory resources 112. The DMA range 110-1 can be provided to and/or accessed by one or more BM devices including the BM device 106 and by the root port device 104. As used herein, the DMA ranges 110-1 and 110-2 include a range of addresses to the memory resource 112. The range of addresses can be physical or logical memory addresses.

A request (e.g., DMA request) from a BM device 106 can be issued at a physical (PHY) level, which is at the hardware level below software or firmware levels. A software level refers to a level of a system that includes a software program (or multiple software programs). A firmware level refers to a level of a system that include a firmware program (or multiple firmware programs). A software program or firmware program can include machine-readable instructions.

The OS 102 can store and manipulate the DMA range 110-1. Although the example provided in FIG. 1 shows a single DMA range 110-1 and a single DMA range 110-2, the OS 102 and the root port device 104 can store multiple DMA ranges. For example, a first DMA range corresponding to a first BM device can be stored in the OS 102 and/or the root port device 104, a second DMA range corresponding to a second BM device can be stored in the DMA OS 102 and/or the root port device 104, and a third DMA range corresponding to a third BM device can be stored in the OS 102 and/or the root port device 104, etc. That is, the OS 102 can generate, store, and update a DMA range for each BM device that is coupled to system 100 and verified as a trusted device by the system 100.

The OS 102 can generate, modify, and/or delete the DMA range 110-1 and/or the DMA range 110-2. For example, the OS 102 can generate a DMA range 110-1 and set the DMA range 110-1 to a default value as the BM device 106 is coupled to the system 100. The default value for the BM device 106 can be a zero range or a null range. The OS 102 can increase or decrease the DMA range 110-1 as the BM device 106 requests an increase to the range or requests a decrease to the range. The OS 102 can reset the DMA range 110-1 or delete the DMA range 110-1 as the BM device 106 becomes inactive and/or as the BM device 106 is decoupled from the system 100. The OS 102 can update the DMA range 110-2 to reflect the changes made to the DMA range 110-2. For example, upon deleting the DMA range 110-2, the OS 102 can delete the DMA range 110-2 or provide instructions to the root port device 104 to delete the DMA range 110-2.

The BM device 106 can be coupled to the system 100 through a peripheral component interconnect express (PCIe) port, for example. The BM device 106 can be a PCIe device which is removably connected to the system 100.

The memory resource 112 can refer to a memory or a portion of a memory, where a memory can include a single memory device or a collection of memory devices. A memory device can include a dynamic random-access memory (DRAM) device, a static random-access memory (SRAM) device, a solid-state memory device, and/or a disk drive, among other types of memory devices.

As used herein, the driver 108 can include machine-readable instructions to operate and/or control the BM device 106. The driver 108 can comprise an interface to the BM device 106. The driver 108 can enable the OS 102 to access the BM device 106. The driver 108 can also enable the BM device 106 to access the OS 102. For example, the driver 108 can receive a request for a range of addresses. The driver 108 can provide the request for a range of addresses to the OS 102.

The root port device 104 can also store the DMA range 110-2. The DMA range 110-2 can reflect of the DMA range 110-1. For example, the DMA range 110-1 can be a copy of the DMA range 110-1. The DMA range 110-2 can be stored in registers of the root port device 104. The DMA range 110-2 can also be stored in the memory resource 112. In such examples, the root port device 104 can retrieve the DMA range 110-2 from the memory resource 112 to verify a DMA request provided by the BM device 106. The DMA range 110-2 can be stored in the memory resource 112 which is identified by the DMA request or in a memory resource which is a different memory resource than is identified by the DMA request.

There may be times when the DMA range 110-1 and the DMA range 110-2 are not synchronized. The OS 102 can update the DMA range 110-2 to reflect the DMA range 110-1 without receiving a request from the root port device 104. In some examples, the root port device 104 can request an update of the DMA range 110-2.

The BM device 106 can be coupled to the system 100. Upon coupling of the BM device 106 to the system 100, the OS 102 can verify that the BM device 106 is on a list of trusted devices by retrieving the ID of the BM device 106 and verifying that the ID of the BM device 106 is one of a plurality of trusted IDs stored by the OS 102. If the BM device 106 is not a trusted device, then the OS 102 can cease providing power to the BM device 106.

If the BM device 106 is a trusted device, then the OS 102 can generate the DMA range 110-1 corresponding to the BM device 106 and can add the DMA range 110-1 to a plurality of DMA ranges. The initial value of the DMA range 110-1 can be set to a predetermined value.

The BM device 106 can request a number of addresses from the OS 102. For example, the BM device 106 can request an address and/or a range of addresses from the OS 102. The request for the range of addresses can include an ID of the BM device 106.

If the OS 102 determines that a data structure used to organize the plurality of DMA ranges does not include the ID of the BM device 106, then the OS 102 can determine if the BM device 106 is a trusted device using the ID of the BM device. If the OS 102 does not identify the BM device 106 as a trusted device, the OS 102 can refrain from generating and/or providing a DMA range 110-1 to the BM device 106 and/or the root port device 104. The OS 102 can retain power from the BM device 106. If the OS 102 identifies the BM device 106 as a trusted device, the OS 102 can generate a DMA range 110-1 corresponding to the BM device 106.

If the OS 102 determines that a data structure used to organize the plurality of DMA ranges includes the ID of the BM device 106, the OS 102 can retrieve the DMA range 110-1. The OS 102 can retrieve a DMA range 110-1 using the ID of the BM device 106. For example, the OS 102 can use the ID of the BM device 106 to index into a data structure to retrieve the DMA range 110-1 from a plurality of DMA ranges corresponding to a plurality of devices including the BM device 106.

Upon retrieving the DMA range 110-1, the OS 102 can determine if the address or the range of addresses requested are included in the DMA range 110-1. If the requested addresses are not in the DMA range 110-1, the OS 102 can determine whether any part of the requested range of addresses has been assigned to a different DMA range from the plurality of DMA ranges. That is, the OS 102 can determine if the requested range of addresses have been reserved for a different device and/or application.

If the requested range of addresses has not been reserved for a different application and/or device, the OS 102 can add the requested range of addresses to the DMA range 110-1. If the requested range of addresses has been reserved for a different application and/or device, the OS 102 can refrain from adding the requested range of addresses to the DMA range 110-1. The OS 102 may add an alternative range of addresses to the DMA range 110-1 responsive to determining that at least part of the requested range of addresses have been reserved for a different application and/or device. If the requested range of addresses is in the DMA range 110-1, the OS 102 can provide the DMA range 110-1 to the BM device 106 to indicate approval to access the range of addresses. That is, if the requested range of addresses is verified as being in the DMA range 110-1, the OS 102 can provide the DMA range 110-2 to the BM device 106.

In some examples, the request for a range of addresses provided by the BM device 106 may include an ID of the BM device 106 but not a range of addresses. In such examples, the OS 102 can generate a range of addresses and provide the range of addresses upon verifying that the BM device 106 is a trusted device. The request for a range of addresses can further include an ID of the BM device 106 and size of addresses. The size of addresses may be provided as an offset including a numerical value indicating the width of the range of addresses requested. The OS 102 may generate an address and utilize the offset to generate a plurality of addresses comprising the range of addresses. The OS 102 may add the address and the offset to the DMA range 110-1. The OS 102 can provide the address and the offset to the BM device 106 to indicate that the requested range of addresses have been granted.

Upon receiving, through the driver 108, the requested range of address, the BM device 106 can generate and provide a DMA request to request access to the memory resource 112. As used herein, a DMA request can include a request for data from the memory resource 112. The DMA request can include, for example, an address (e.g., a memory address) or a range of addresses. The DMA request can also include an ID of the BM device 106.

The DMA request can include the range of addresses which have been approved by the OS 102. Upon receiving the DMA request, the root port device 104 can determine whether the requested range of addresses is in the DMA range 112-2. If the requested range of addresses are verified as being in the DMA range 112-2, the root port device 104 can process the DMA request. For example, the root proxy device 104 can retrieve the data stored in memory resource 112 at the address and offset described by the DMA range 112-2 and/or by the DMA request and can provide the data to the BM device 106. The root proxy device 104 can retrieve the data by providing a read command to the memory resource 112.

If the requested range of addresses is not in the DMA range 112-2, the root port device 104 can deny the DMA request. For example, the root port device 104 can ignore the DMA request, or the root port device 104 can provide a message to the BM device 106 indicating that the DMA request was denied.

In some examples, the root proxy server 104 can request an update to the DMA range 112-2 responsive to determining that the requested range of addresses is not in the DMA range 112-2. For example, the root proxy server 104 can provide the update request to the OS 102. The OS 102 can determine whether the DMA range 112-2 is outdated and can update the DMA range 112-2 if the DMA range 112-2 is outdated. The OS 102 may also update the DMA range 112-2 without determining whether the DMA range 112-2 is outdated. The OS 102 can update the DMA range 112-2 to reflect the DMA range 112-1.

Responsive to receiving an update to the DMA range 112-2, the root port device 104 can determine whether the requested range of addresses received in the DMA request is in the updated DMA range 112-2. If the requested range of addresses is in the updated DMA range 112-2, then the root port device 104 can respond by processing the DMA request. If the requested range of addresses is not in the updated DMA range 112-2, then the root port device 104 can refrain from processing the DMA request as previously described.

In some examples, the DMA request can comprise an address and an ID of the BM device 106 that uniquely identifies the device. Uniquely identifying the device can include distinguishing the BM device 106 from other BM devices regardless of how the BM devices are coupled to the system 100. For example, the ID can identify the BM device 106 without including information regarding a port through which the BM device 106 is coupled to the system 100, a channel associated with the port, and/or a function associated with the BM device 106. Adding port information, channel information, and/or function information can identify a coupling of the BM device 106 to the system 100 which does not uniquely identify the BM device 106 given that a different device can be coupled to the system 100 in a same manner which would make the different device indistinguishable from the BM device 106.

The ID of the BM device 106 can include an ID of the hardware comprising the BM device 106 and/or an ID of the hardware and firmware comprising the BM device 106, among other examples of IDs which uniquely identify the BM device. The ID can also be an ID assigned to the BM device 106 by the OS 102.

Figure 2:
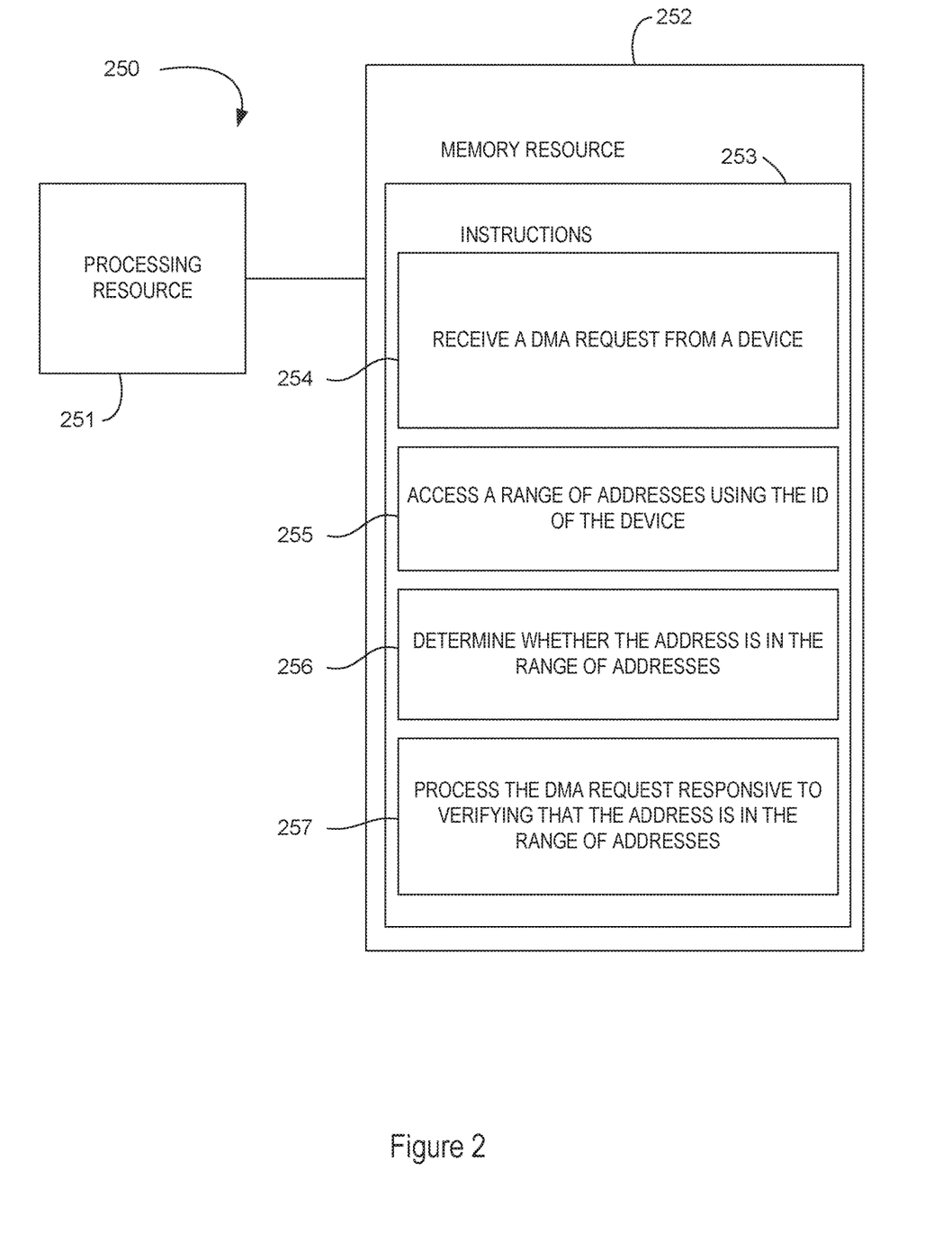
FIG. 2 illustrates an example of an apparatus for processing DMA requests by verifying addresses of a memory resource consistent with the disclosure.

FIG. 2 illustrates an example of an apparatus 250 for processing DMA requests by verifying addresses of a memory resource consistent with the disclosure. As shown in FIG. 2, the apparatus 250 includes a processing resource 251 and a memory resource 252.

The processing resource 251 may be a hardware processing unit such as a microprocessor, application specific instruction set processor, coprocessor, network processor, or similar hardware circuitry that can cause machine-readable instructions to be executed. In some examples, the processing resource 251 may be a plurality of hardware processing units that can cause machine-readable instructions to be executed. The processing resource 251 can include central processing units (CPUs) and/or graphics processing units (GPUs), among other types of processing units. The memory resource 252 may be any type of volatile or non-volatile memory or storage, such as random-access memory (RAM), flash memory, read-only memory (ROM), storage volumes, a hard disk, or a combination thereof.

The memory resource 252 may store instructions 253 thereon. When executed by the processing resource 251, the instructions 253 may cause the apparatus 250 to perform specific tasks and/or functions. For example, at block 254, the memory resource 252 may store instructions 253 which may be executed by the processing resource 251 to cause the apparatus 250 to receive a DMA request from a device, wherein the DMA request comprises an address and an ID of the device that uniquely identifies the device and wherein the device is a BM device. At block 255, the memory resource 252 may store instructions 253 which may be executed by the processing resource 251 to cause the apparatus 250 to access a range of addresses using the ID of the device. At block 256, the memory resource 252 may store instructions 253 which may be executed by the processing resource 251 to cause the apparatus 250 to determine whether the address is in the range of addresses. At block 257, the memory resource 252 may store instructions 253 which may be executed by the processing resource 251 to cause the apparatus 250 to process the DMA request responsive to verifying that the address is in the range of addresses.

In some examples, the range of addresses are received at the root port device from an OS. Accessing the range of addresses can further comprise instructions 253 to read the range of addresses from a register of the root port device. Access the range of addresses can further comprise instructions 253 to read the range of addresses from a memory resource. In some examples, the range of addresses can be set to zero responsive to determining that the ID of the device is not one of a plurality of IDs of authorized devices.

Figure 3:
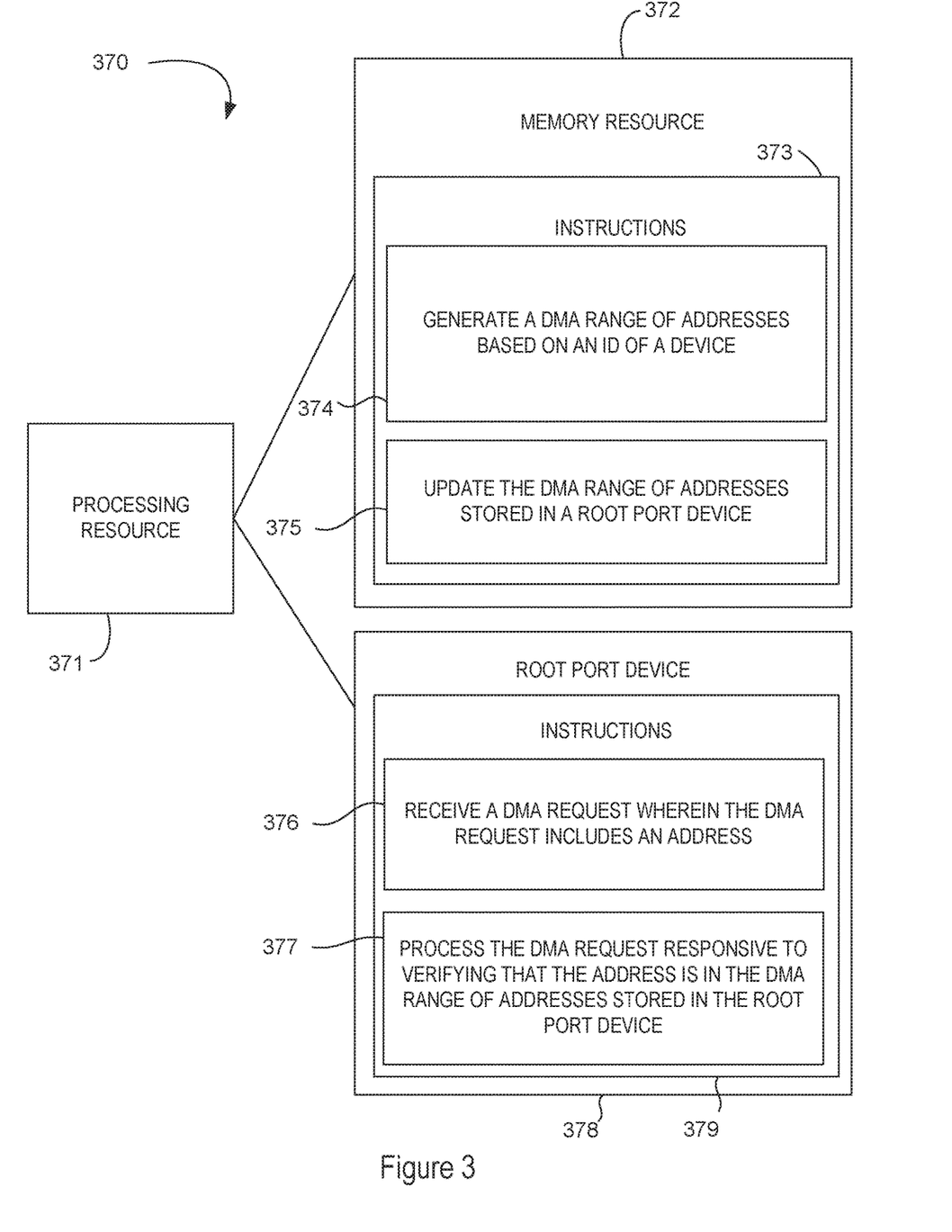
FIG. 3 illustrates an example flow diagram for processing DMA requests by verifying addresses of a memory resource consistent with the disclosure.

FIG. 3 illustrates an example flow diagram for processing DMA requests by verifying addresses of a memory resource consistent with the disclosure. As shown in FIG. 3, the apparatus 370 includes a processing resource 371, a memory resource 372, and a root port device 378.

The processing resource 371 may be a hardware processing unit such as a microprocessor, application specific instruction set processor, coprocessor, network processor, or similar hardware circuitry that can cause machine-readable instructions to be executed. In some examples, the processing resource 371 may be a plurality of hardware processing units that can cause machine-readable instructions to be executed. The processing resource 371 can include central processing units (CPUs) and/or graphics processing units (GPUs), among other types of processing units. The memory resource 372 may be any type of volatile or non-volatile memory or storage, such as random-access memory (RAM), flash memory, read-only memory (ROM), storage volumes, a hard disk, or a combination thereof.

The memory resource 372 may store instructions 373 thereon. When executed by the processing resource 371, the instructions 373 may cause the apparatus 370 to perform specific tasks and/or functions. For example, at block 374, the memory resource 372 may store instructions 373 which may be executed by the processing resource 371 to cause the apparatus 370 to generate a DMA range of addresses based on an ID of a device. The device can be a BM device and the ID can uniquely identify the device. At block 375, the memory resource 372 may store instructions 373 which may be executed by the processing resource 371 to cause the apparatus 370 to update the DMA range of addresses stored in a root port device 378.

A root port device 378 may store instructions 379 thereon. When executed by the root port device 378, the instructions 379 may cause the root port device 378 to perform specific tasks and/or functions. For example, at block 376, the root port device 378 may store instructions 379 which may be executed by the root port device 378 to cause the root port device 378 to receive a DMA request wherein the DMA request includes an address. At block 376, the root port device 378 may store instructions 379 which may be executed by the root port device 378 to cause the root port device 378 to process the DMA request responsive to verifying that the address is in the DMA range of addresses stored in the root port device.

In some examples, the root port device can receive the DMA request from the device (e.g., the BM device). The processor 371 may execute instructions 373 to detect the device and enable power to the device responsive to detecting the device. The processor 371 may execute instructions 373 to read the ID of the device, compare the ID of the device with a plurality of IDs of authorized devices, and responsive to determining that the ID is in the plurality of IDs, load a driver corresponding to the device. The processor 371 can also receive a request for a range of addresses from the driver corresponding to the device. Generating the DMA range can include generating the DMA range responsive to receiving a request for a range of addresses from the driver corresponding to the device. In some examples, the DMA range can be generated responsive to receiving a request for the DMA range from the root port device.

Figure 4:
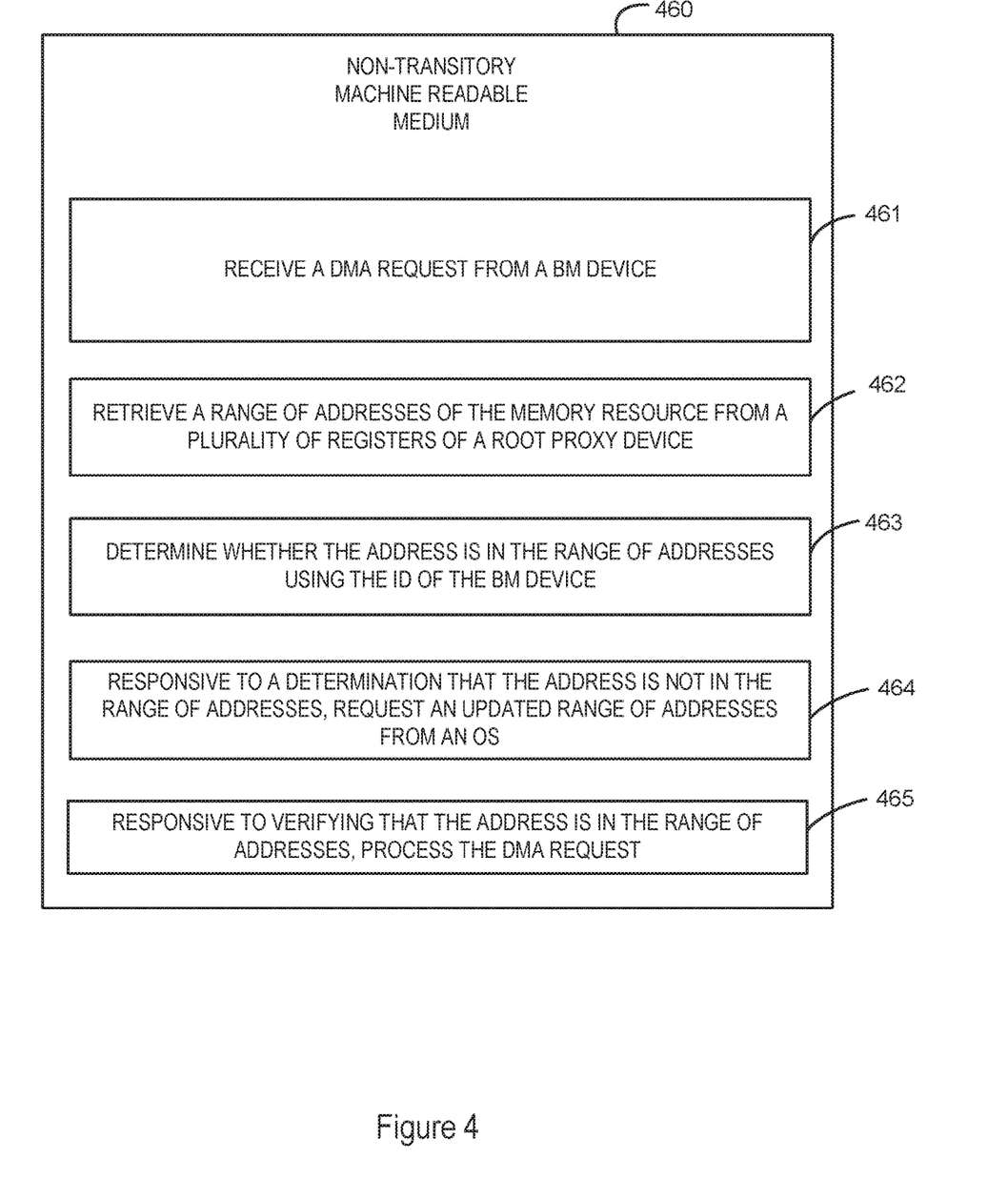
FIG. 4 illustrates an example non-transitory machine-readable medium for processing DMA requests by verifying addresses of a memory resource consistent with the disclosure.

FIG. 4 illustrates an example non-transitory machine-readable medium for processing DMA requests by verifying addresses of a memory resource consistent with the disclosure. A processing resource may execute instructions stored on the non-transitory machine readable medium 460. The non-transitory machine readable medium 460 may be any type of volatile or non-volatile memory or storage, such as random-access memory (RAM), flash memory, read-only memory (ROM), storage volumes, a hard disk, or a combination thereof.

The example medium 460 stores instructions 461 executable by a processing resource to receive a DMA request from a BM device. The DMA request can include an ID of the BM device and an address of a memory resource. The ID can uniquely identify the BM device. The example medium 460 stores instructions 462 executable by a processing resource to retrieve a range of addresses of the memory resource. The range of addresses can be retrieved from a plurality of registers of a root proxy device. The range of addresses can also be retrieved from the memory resource. The example medium 460 stores instructions 463 executable by the processing resource to determine whether the address is in the range of addresses using the ID of the BM device. The example medium 460 stores instructions 464 executable by the processing resource to, responsive to a determination that the address is not in the range of addresses, request an updated range of addresses from the OS. The example medium 460 stores instructions 465 executable by the processing resource to, responsive to verifying that the address is in the range of addresses, process the DMA request.

In some examples, the BM device is a PCIe device. The DMA request can be a BM cycle. The example medium 460 can also comprise instructions to, responsive to a request for the updated range of addresses, receive the updated range of addresses from the OS. The example medium 460 can also comprise instructions to, responsive to receipt of the updated range of addresses, determine whether the address is in the updated range. The example medium 460 can further comprise instructions to, responsive to a determination that the address is in the updated range of addresses, process the DMA request. The example medium 460 can further comprise instructions to, responsive to a determination that the address is not in the updated range of addresses, refrain from processing the DMA request.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. As used herein, designators such as "N", etc., particularly with respect to reference numerals in the drawings, indicate that a number of the particular feature so designated can be included. A "plurality of" is intended to refer to more than one of such things.

What is claimed:

1. An apparatus comprising:
   a memory;
   a processor executing instructions stored in the memory to:
      receive a direct memory access (DMA) request from a driver of a device, wherein:
         the DMA request comprises an address and an identifier (ID) of the device that uniquely identifies the device; and
         the device is a bus mastering (BM) device, wherein the BM device is a trusted device, and wherein the BM device is to:
            access a range of addresses using the ID of the device;
            determine whether the address is in the range of addresses; and
            process the DMA request responsive to verifying that the address is in the range of addresses.

2. The apparatus of claim 1, wherein the processor is to receive the range of addresses from an operating system (OS).

3. The apparatus of claim 1, wherein the processor is to read the range of addresses from a register of the apparatus.

4. The apparatus of claim 1, wherein the processor is to read the range of addresses from memory resource.

5. An apparatus comprising:
   a memory;
   a processor executing instructions stored in the memory to:
      generate a direct memory access (DMA) range of addresses based on an identifier (ID) of a device, wherein the device is a bus mastering (BM) device and the ID uniquely identifies the device, wherein the BM device is a trusted device, and wherein the BM device is to:
         update the DMA range of addresses stored in a root port device; and
      the root port device to:
         receive a DMA request wherein the DMA request includes an address; and
         process the DMA request responsive to verifying that the address is in the DMA range of addresses stored in the root port device.

6. The apparatus of claim 5, wherein the root port device to receive the DMA request is further to receive the DMA request from the device.

7. The apparatus of claim 5, wherein the processor further executes instructions to:
   detect the device; and
   enable power to the device responsive to detecting the device.

8. The apparatus of claim 7, wherein the processor further executes instructions to:
   read the ID of the device;
   compare the ID of the device with a plurality of IDs of authorized devices; and
   responsive to determining that the ID is in the plurality of IDs, load a driver corresponding to the device.

9. The apparatus of claim 8, wherein the processor further executes instructions to receive a request for a range of addresses from the driver corresponding to the device.

10. The apparatus of claim 9, wherein the processor executing instructions to generate the DMA range further executes instructions to generate the DMA range responsive to receiving the request for the range of addresses from the driver corresponding to the device.

11. The apparatus of claim 5, wherein the processor executing instructions to generate the DMA range further executes instructions to generate the DMA range responsive to receiving a request for the DMA range from the root port device.

12. A non-transitory machine-readable medium storing instructions executable by a processing resource to:
   receive a direct memory access (DMA) request from a driver of bus mastering (BM) device, wherein:
      the BM device is a trusted device;
      the DMA request includes an identifier (ID) of the BM device and an address of a memory resource; and
      the ID uniquely identifies the BM device;
   retrieve a range of addresses of the memory resource from a plurality of registers of a root proxy device;
   determine whether the address is in the range of addresses using the ID of the BM device;
   responsive to a determination that the address is not in the range of addresses, request an updated range of addresses from an operating system (OS); and
   responsive to verifying that the address is in the range of addresses, process the DMA request.

13. The non-transitory machine-readable medium of claim 12, wherein the BM device is a peripheral component interconnect express (PCIe) device.

14. The non-transitory machine-readable medium of claim 12, further comprising instructions executable to:
   responsive to a request for the updated range of addresses, receive the updated range of addresses from the OS; and
   responsive to receipt of the updated range of addresses, determine whether the address is in the updated range.

15. The non-transitory machine-readable medium of claim 12, further comprising instruction to:
   responsive to a determination that the address is in the updated range of addresses, process the DMA request; and
   responsive to a determination that the address is not in the updated range of addresses, refrain from processing the DMA request.

* * * * *